US009201877B1

(12) United States Patent
Humby et al.

(10) Patent No.: US 9,201,877 B1
(45) Date of Patent: Dec. 1, 2015

(54) METHOD AND SYSTEM FOR DESCRIBING HOW RETENTION SHOULD BE APPLIED TO COMPOSITE OBJECTS

(71) Applicant: EMC Corporation, Hopkinton, MA (US)

(72) Inventors: David Humby, Richmond (CA); J D Dorman, Toronto (CA); Steve Sauder, Toronto (CA); Dan Taillefer, Toronto (CA)

(73) Assignee: EMC Corporation, Hopkinton, MA (US)

( * ) Notice: Subject to any disclaimer, the term of this patent is extended or adjusted under 35 U.S.C. 154(b) by 27 days.

(21) Appl. No.: 13/630,096

(22) Filed: Sep. 28, 2012

(51) Int. Cl.
*G06F 17/30* (2006.01)
*G06F 17/00* (2006.01)

(52) U.S. Cl.
CPC .................................... *G06F 17/30* (2013.01)

(58) Field of Classification Search
CPC ............ G06F 11/1464; G06F 11/1451; G06F 2201/84; G06F 11/1461; G06F 11/1435; G06F 11/1446; G06F 17/302; G06F 17/30575; G06F 3/017; G06F 11/1453; G06F 17/30; G06F 17/30289; G06F 17/30371; G06F 3/00
See application file for complete search history.

(56) References Cited

U.S. PATENT DOCUMENTS

| | | | |
|---|---|---|---|
| 2007/0239501 A1* | 10/2007 | Cunningham et al. | 705/7 |
| 2010/0106689 A1* | 4/2010 | Huslak | 707/662 |
| 2011/0131251 A1* | 6/2011 | Abnous et al. | 707/802 |
| 2011/0276540 A1* | 11/2011 | Stakutis et al. | 707/662 |
| 2012/0215749 A1* | 8/2012 | Van Beneden et al. | 707/694 |

* cited by examiner

*Primary Examiner* — Yicun Wu
(74) *Attorney, Agent, or Firm* — Dergosits & Noah LLP; Todd A. Noah

(57) ABSTRACT

Techniques allow for applying a retention policy to a composite object. For each composite object type there is a description of the composite object structure and rules that determine how the retention policy is to be applied. A retention application can review the descriptions and rules and, based on the review, apply the appropriate retention policy to each of the objects that make up the composite object.

20 Claims, 7 Drawing Sheets

```
<rule name = "name of this rule">
<object types> ← 710
        <object type name = "type name"> ← 715
                <related types> ← 720
                        <related object type name = "type name"> ← 725
                                <link types> ← 730
                                        <attribute name= "attribute name" />
                                        <relation name = "relation name" />
                                        <folder name = "folder name" />
                                </link type>
                        </related object type>
                </related types>
                <rules> ← 735
                        <attribute name = "" value = "" policy = "" /> ← 740
                        <relation name = "" policy = ""/> ← 745
                        <folder name = "" /> ← 750
                        <object id = "", policy = "" /> ← 755
                        < root value = "yes/no" /> ← 760
                </rules>
        </object type>
</object types>
```

Figure 7

METHOD AND SYSTEM FOR DESCRIBING HOW RETENTION SHOULD BE APPLIED TO COMPOSITE OBJECTS

BACKGROUND

The present invention relates to the field of information technology, including, more particularly, to systems and techniques for document management.

Many companies turn to document management systems to help them store and manage their electronic documents. Some examples of documents can include emails, email attachments, technical documents, manuals, contracts, pharmaceutical submissions (e.g., drug approval applications), product catalogs, data sheets, case files, product specifications, and customer communications—just to name a few examples.

Statues and regulations require companies to preserve certain documents for specified time periods. Upon expiration of the time period, the document can be disposed. Automating retention, i.e., the information preservation and disposition process, is not a trivial task because of the amount of information that is generated and the complex relationships among different pieces of related information.

Thus, there is a need to provide systems and techniques to manage information retention.

BRIEF DESCRIPTION OF THE FIGURES

FIG. 7 shows an example of XML file describing a structure of a complex object in a specific implementation.

DETAILED DESCRIPTION

Figure 1:
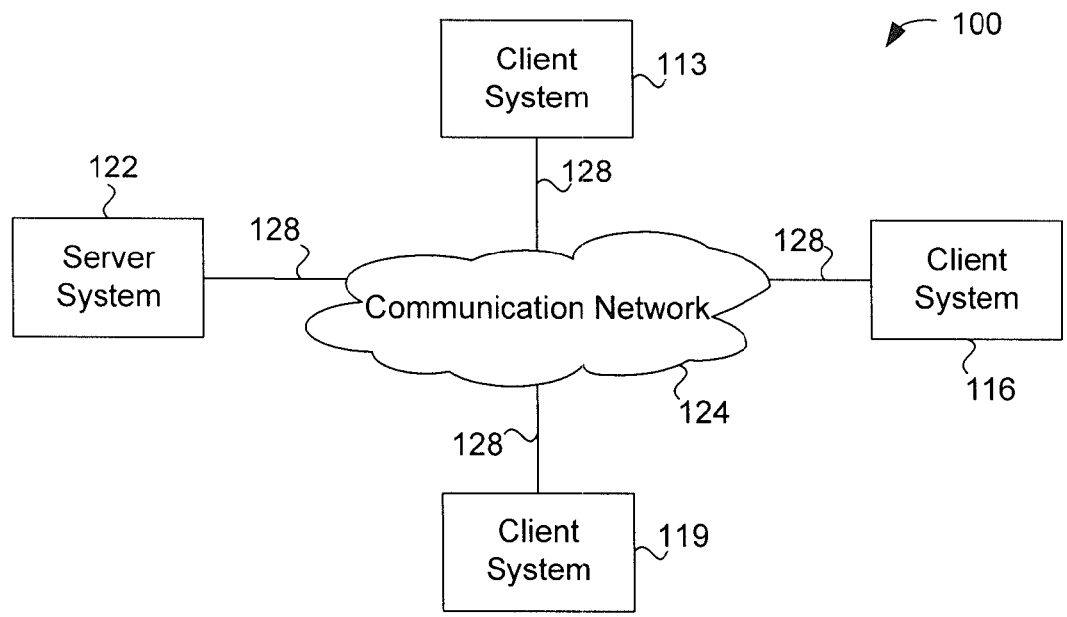
FIG. 1 shows a block diagram of a client-server system and network in which an embodiment of the invention may be implemented.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft® Corporation, and the Firefox® browser provided by Mozilla® Foundation, and others.

Figure 2:
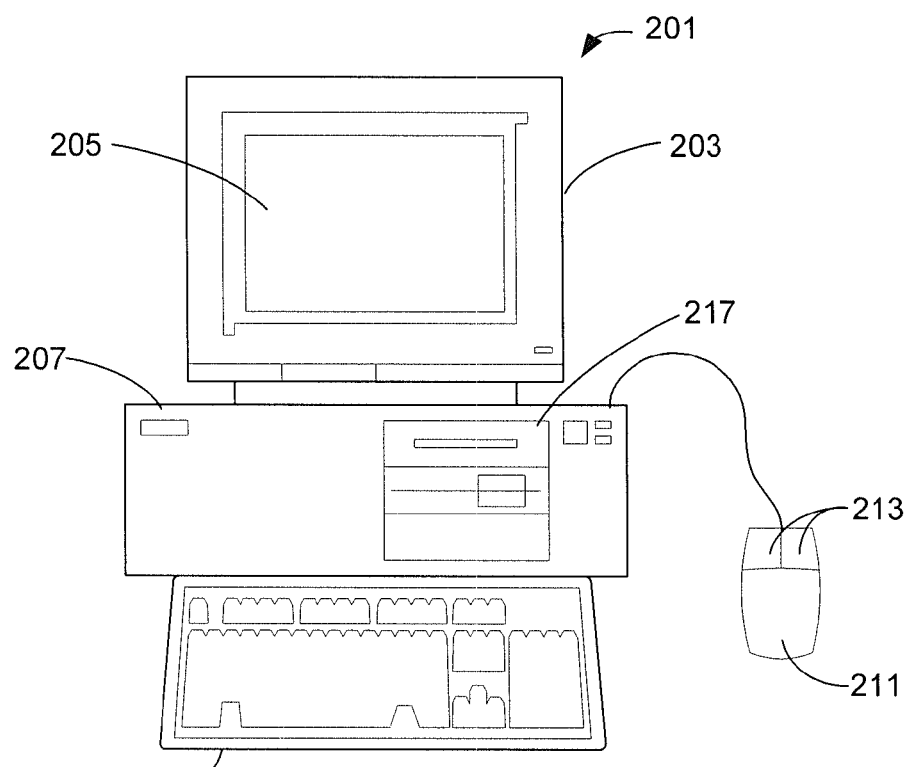
FIG. 2 shows a more detailed diagram of an exemplary client or computer which may be used in an implementation of the invention.

FIG. 2 shows an exemplary client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
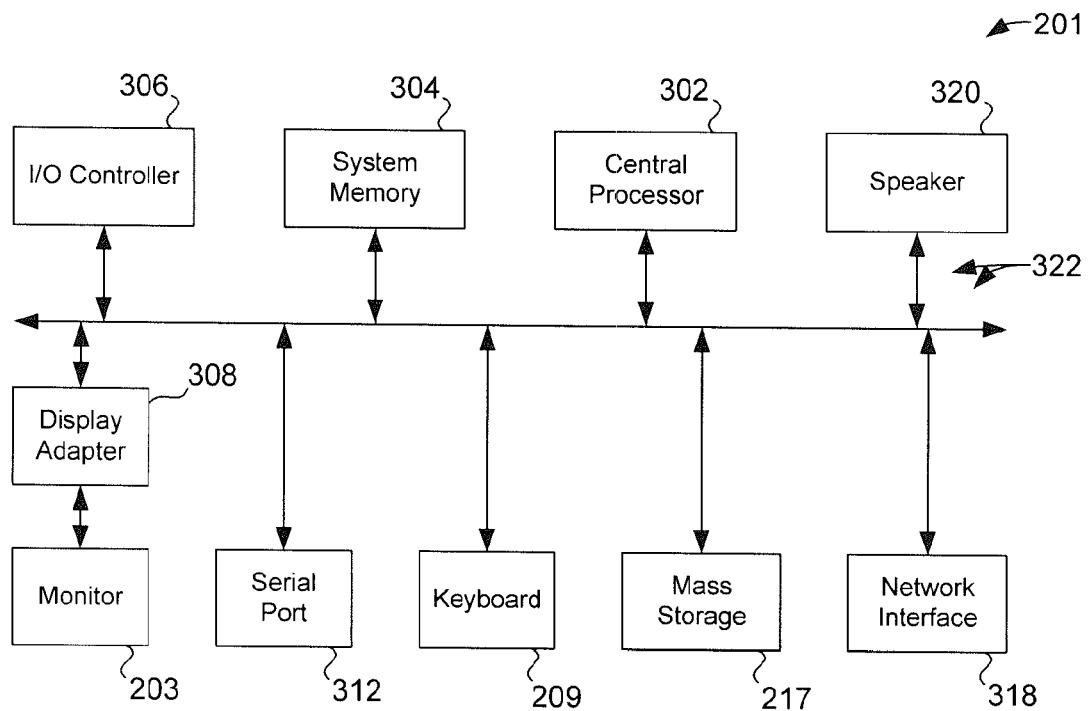
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95®, 98, Me, Windows NT®, Windows 2000®, Windows XP®, Windows XP® x64 Edition, Windows Vista®, Windows 7®, Windows CE®, Windows Mobile®), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
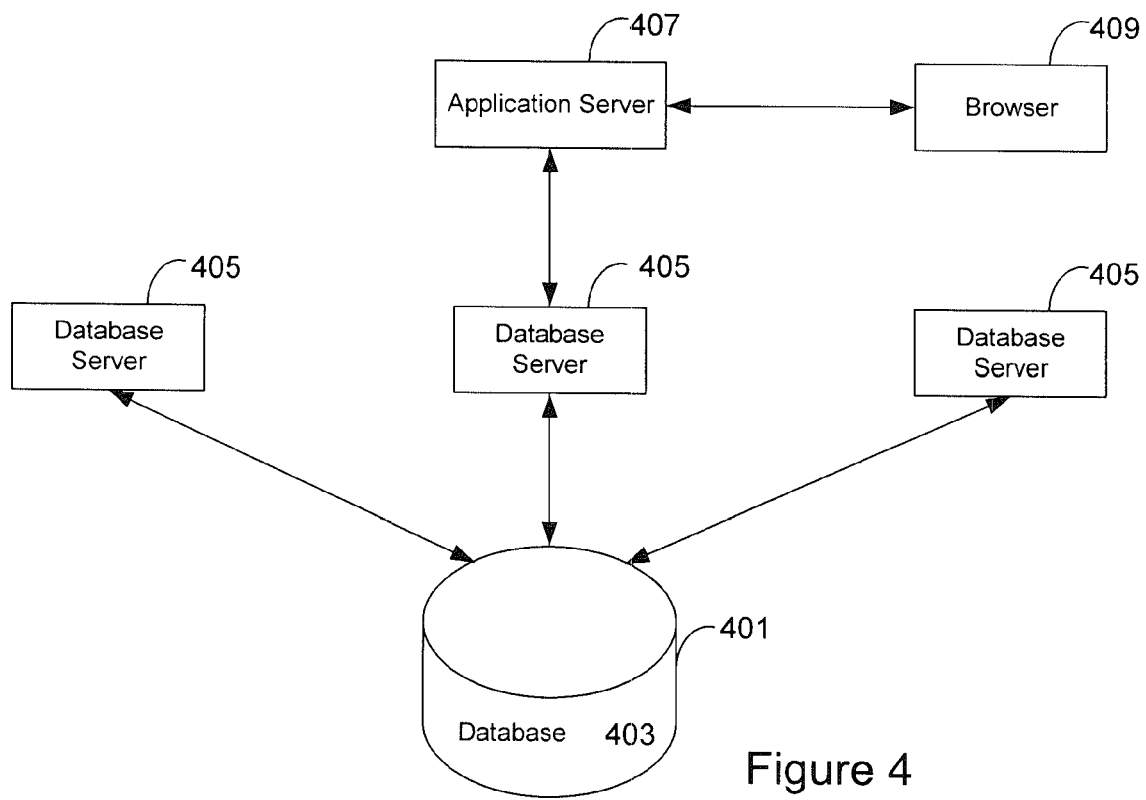
FIG. 4 shows a data source or data service in the form of a database system.

FIG. 4 shows a data source or data service in the form of a database system. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is an Extensible Markup Language (XML) database. An XML database is a data persistence software system that allows data to be stored in XML format. Another example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

Figure 5:
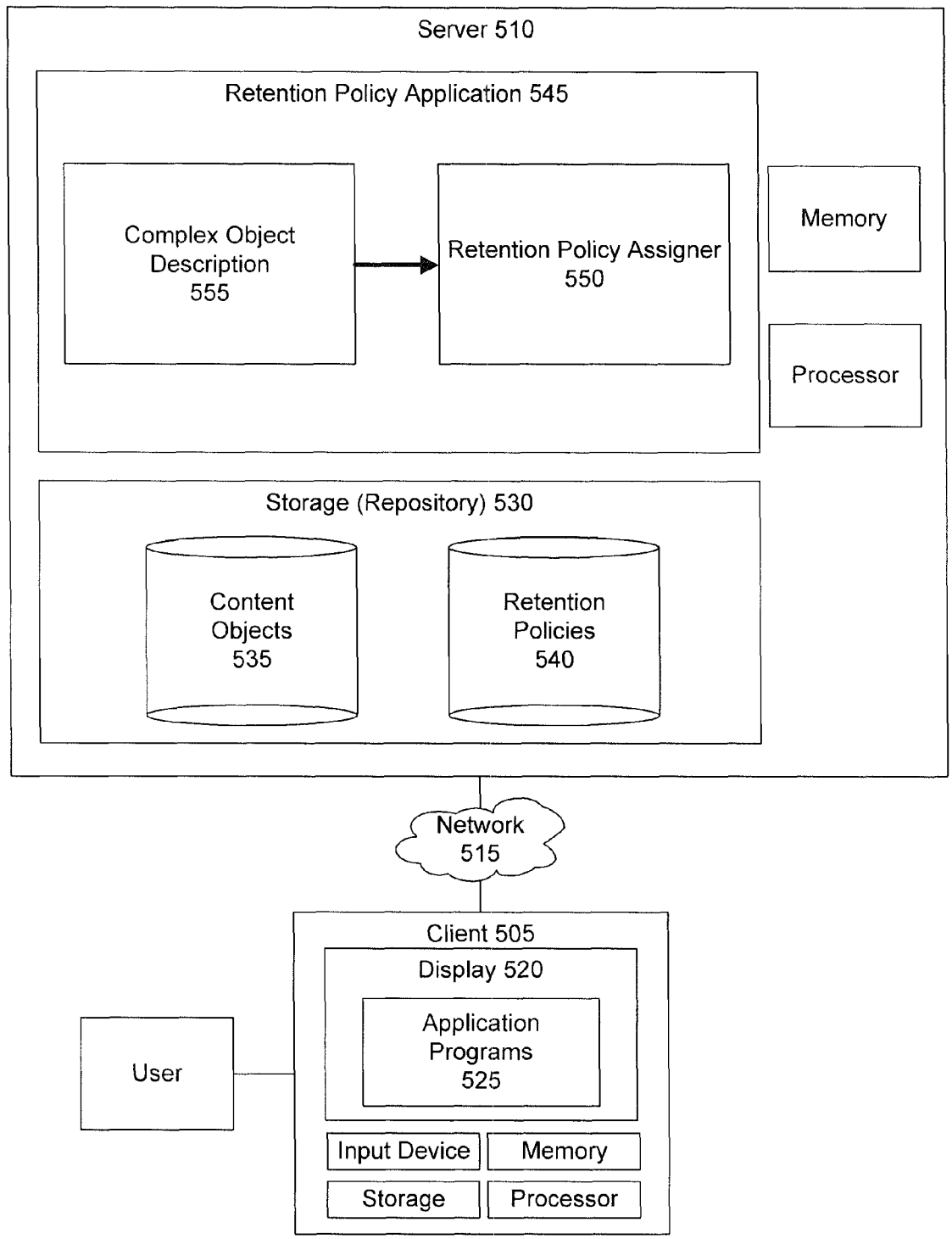
FIG. 5 shows a block diagram of a system for applying retention to complex objects.

FIG. 5 is a block diagram showing a system for document management. This system helps organizations such as companies, governments, and other entities track and store content, and dispose content according to defined retention policies. Content can include complex objects which are made up of other objects. A complex object may be referred to as a composite object, a composition object, or a virtual document. A complex object is made of other objects that are related based on a process, an application, an attribute, a relationship, or other property or parameter.

An embodiment of the invention allows different (or the same) retention policies to be applied to the different objects within a complex object. In a specific embodiment, there is for each composition object type, a description that describes the structure of the composite object and additional rules that determine how the retention policy should be applied to each object that makes up the composite object. A simple rule would be if the policy is applied or not. In a specific implementation, the description is provided in an XML file. The information in the XML file provides the retention application with the structure of the composition object and what object within the composite object to apply the retention policy. When attempting to apply retention to a composition object, the file lets the retention application know the structure of the composition object and what object within the composite object to apply the retention policy. In other words, through the information in the file, the retention application will know what the structure of the composite object that are created by customers and other product groups is so as to apply the retention to the objects that make up the composition object.

Referring now to FIG. 5, a system of the invention may include any number of clients, such as a client 505 and others. The clients access a server system 510 via a network 515. The network is as shown in FIG. 1 and described above. The clients are general purpose computers with hardware and software, such as shown in FIGS. 2-3 and described above. For example, client 505 includes a display 520, an application program 525, a processor, memory, storage, and an input device (e.g., mouse, keyboard, stylus, or touchscreen).

Server system 510 includes components similar to the components shown in FIGS. 3-4 and described above. For example, the server may include a processor, memory, and storage 530. The storage includes a content objects database 535 and a retention policy database 540. The server includes a retention policy application 545. There is a retention policy assignor 550 and a complex object description 555. There can be a single file having complex object descriptions for each of the different types of complex objects. Alternatively, there can be multiple files, each file having a complex object description for a specific type of complex object.

The retention policy application is responsible for providing retention services for the content objects stored in database 535. The application supports the creation, management, and application of retention policies. Retention is applied to an object according to the retention policies stored in database 540.

An object can be a file system object or a nonfile system object. A file system object may be a document such as a word processing document (e.g, Microsoft Word file), spreadsheet (e.g., Microsoft Excel file), or presentation (e.g., Microsoft PowerPoint presentation). A nonfile system object may be an email message such as a Microsoft Outlook email message. An object can be any unit of information created, received, or maintained by an organization that is evidence of its activities or operations, and has value requiring its retention for a specific period of time. The information may be referred to as a record and may be used as evidence in civil litigation, be preserved for purposes of regulatory compliance, be used in audits, to enforce contractual agreements, and for many other purposes.

An object can be an electronic document, scanned image (e.g., scanned paper document image), email, email attachment, text message (e.g., SMS text message, Tweet), discussion thread, web page, data, computer code, video file (e.g., video recording), audio file (e.g, audio recording), thumbnail image, audio/video (A/V) clip, instant message, folder, folder tree, picture, digital image, log (e.g., activity log, sign-in sheet, visitor's log), usage data, computer aided design (CAD) drawing, or presentation—just to name a few examples. An object can include or represent a workflow, process, or computer code.

Generally, a retention policy specifies the duration, length, or period of time an object (e.g., document, folder, or folder tree), should be kept based on operational, legal, regulatory, fiscal, or internal requirements. The length of time may be specified using any unit of time (e.g., days, weeks, months, or years). A retention policy may specify disposition procedures to be followed when an object has reached the end of its lifecycle. For example, the object may be deleted, e.g., digitally shredded such that it cannot be recovered.

Figure 6:
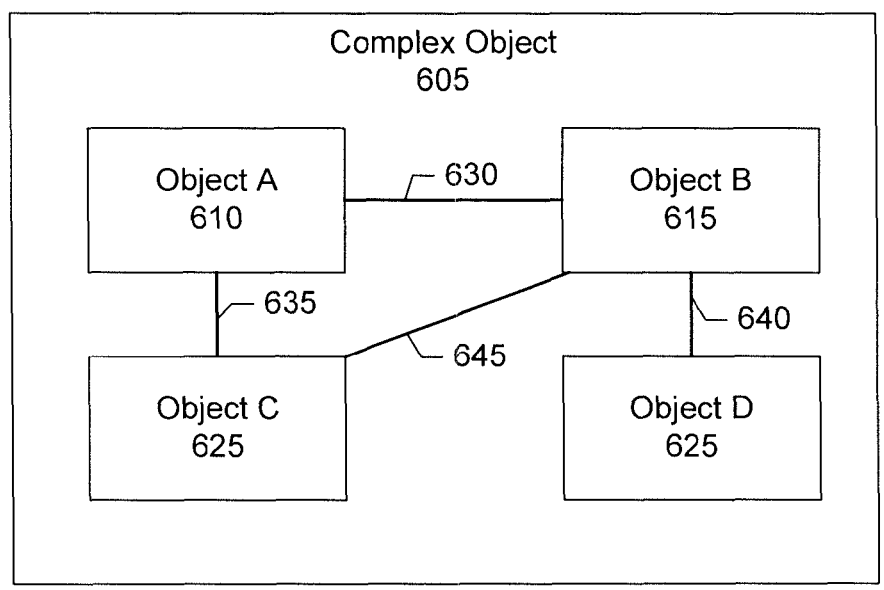
FIG. 6 shows a block diagram of an example of a complex object.

Complex object description 555 provides information describing the structure or schema of a complex object stored in the content object database. FIG. 6 shows a block diagram of an example of a complex object 605 that is made up of object A 610, object B 615, object C 620, and object D 625. The objects are associated, linked, or related to each other as shown by lines 630, 635, 640, and 645. The associations can be by attribute, relation (e.g., parent-child, or peer-to-peer), or by folder name. FIG. 6 shows four objects within the complex object, but this is merely for purposes of illustration. A complex object can have any number of objects. Generally, a complex object is made up of two or more objects. There can be 3, 4, 5, 10, 15, 20, 25, 30, 50, 100, or even more than 100 objects within a complex object. There can be a complex object within a complex object.

A complex object can be a logical object that includes two or more objects that are tracked and stored separately by the system. For example, a complex object may include a set of objects. The objects may have been created at different times, may represent different workflows or processes, may have been created using different application programs (e.g., word processing document versus spreadsheet document), may have been created by different users, may have been created for different purposes, may have been created as a result of different workflows, may have different formats (e.g., .jpeg, .pdf, .doc, .xls, .tiff, .html), may have different sizes (e.g., different megabyte size), may be stored in different locations (e.g., stored remotely from each other), may be encrypted differently (e.g., first object is in an unencrypted format and second object is in an encrypted format), may be different versions of a same document, or combinations of these.

The objects, however, are related. A first object may be related to a second object through an attribute, object metadata (e.g., object author), or both. For example, the first object may include a subject name attribute of person. The second object may include a subject name attribute of the same person. The first object may be related to the second object through a relation such as a hierarchical relationship. For example, the first object may be a parent, primary, or root node and the second object may be a child or sub node of the parent node. There can be any number of hierarchical levels. Objects can be nested. The relationship can be a peer relationship. The first object may be related to the second object by folder name. For example, the first and second object may be stored or organized in the same folder. A specific example of a complex object is an email having an attachment. A first object can include the email content or message. A second object can include the attachment.

Referring now to FIG. 5, the retention policy assigner accesses, consults, reads, examines, analyzes, or parses complex object description 555 to determine or understand the structure of a complex object and to determine what retention policies should be assigned (e.g., applied or bound) to the objects within the complex object. In a specific implementation, the determination of what policy to apply is based on evaluating rules. The rules evaluation may involve factors such as the complex object structure, object associations, object links, object attributes, object folder, other factors. Based on the evaluation, the same or different retention policies may be applied to the objects that make up the complex object. In a specific implementation, the rules are stored in the complex object description file. In another specific implementation, the rules are stored separately from the complex object description file. The rules may be associated with the retention policies. The rules may be stored within the retention policies.

A specific example of a type of complex object is a case, such as a prison inmate case file. The inmate case file can include a collection of other items of content (i.e., objects or related objects) such as a mug shot, record sheet (e.g., inmate name, alias, registration number, race, sentence, fine, date of sentence, maximum term date, minimum term date, occupation, age, date of parole eligibility, discharge date, or disciplinary violations), personal data sheet (e.g., inmate's family background, parental information, marital status, number of children, spouse's address, next-of-kin notification, education, or literacy), fingerprints, daily work record, hospital record, correspondence log (e.g., inmate's incoming and outgoing communications), visitor log (e.g., inmate's visitors and time and date of visit), and so forth.

A feature of the invention allows for fine-grained control regarding the application of retention policies to each of the different types of items within the inmate case file. Different (or the same) retention policies can be applied to each of the items in the inmate case file. For example, based on pre-defined user-configurable rules, a first retention policy may be applied to the inmate mug shot. A second retention policy, different from the first retention policy, may be applied to the inmate record sheet. The first retention policy may have a longer (or shorter) retention period than the second retention policy.

Another example where a case may be used is a customer service call center. A complex object type can include a support case for a software defect. The case can include objects such as support documents, hot fix code, trace files, and the like.

Another example where a case may be used is in travel management. A travel request case may include all the documents that make up a travel request. Specifically, the objects in the case may include the initial request for travel approval, the workflow that approves the request, the itinerary, the tickets and the expense report.

Another example where a case may be used is in employee performance review. This complex object case may include the review initially submitted by the employee, the review filled in by the manager, the signed review, and the approval process for the review.

Another example where a case may be used is in grants management. A grants management case may include the initial grant application, supporting documents for the application, grant review process, approval, paying the grant funds, and periodic reviews.

FIG. 7 shows an example of a specific implementation of a complex object description file. This example shows a sample structure for the rules. In this specific implementation, the complex object description file is implemented as an XML file or XML formatted file. In other specific implementations, a description of a complex object structure may be modeled using a different format. The structure may be described using a declarative approach so that users do not have to provide an explicit control flow or an explicit algorithm.

As shown in the example of FIG. 7, the file includes a set of sections defined by the various XML tags and elements. More particularly, in this example, the sections include object types 710, object type 715, related types 720, related object type 725, link types 730, and rules 735. Object types includes a list of object types in the complex object. Object type describes each of the object types in the complex object. Related types describes all other types that are related to this type. Related object type is the type that is related to the object type. Link types identifies how is this type linked to the object type. The link can be by attribute, by relation, or by folder name.

The rules section lists the rules for the object on how the policy should be applied. A rule specifies the retention policy to apply. Applying a retention policy can be by attribute 740. An attribute retention rule can include a name of the attribute, value of the attribute, and policy to apply. Applying a retention policy can be by relation 745 (e.g., if this relation is present, apply the policy). A relation retention rule can include a name of the relation, and policy to apply. Applying a retention policy can be by folder 750 (e.g., if the object is in this folder, apply the policy). A folder retention rule can include a name of the folder, and policy to apply. Applying a retention policy can be by object 755 (e.g., apply the policy based on another object). An object retention rule can include an identifier of the object, and the policy to apply. Applying a retention policy can be by root object 760 (e.g., apply the same policy as the root object, in other words, apply the same policy that was applied to the root object). A root object retention rule can include a value (e.g., yes or no) as to whether to apply the same policy as the root object.

The complex object description file can include a section describing how a policy gets applied. There can be a section describing relationships between the objects (e.g., these types of objects can have this type of relationship). A policy may be applied by following a relationship between two objects. A policy may be applied based on predefined criteria or attributes.

Figure 8:
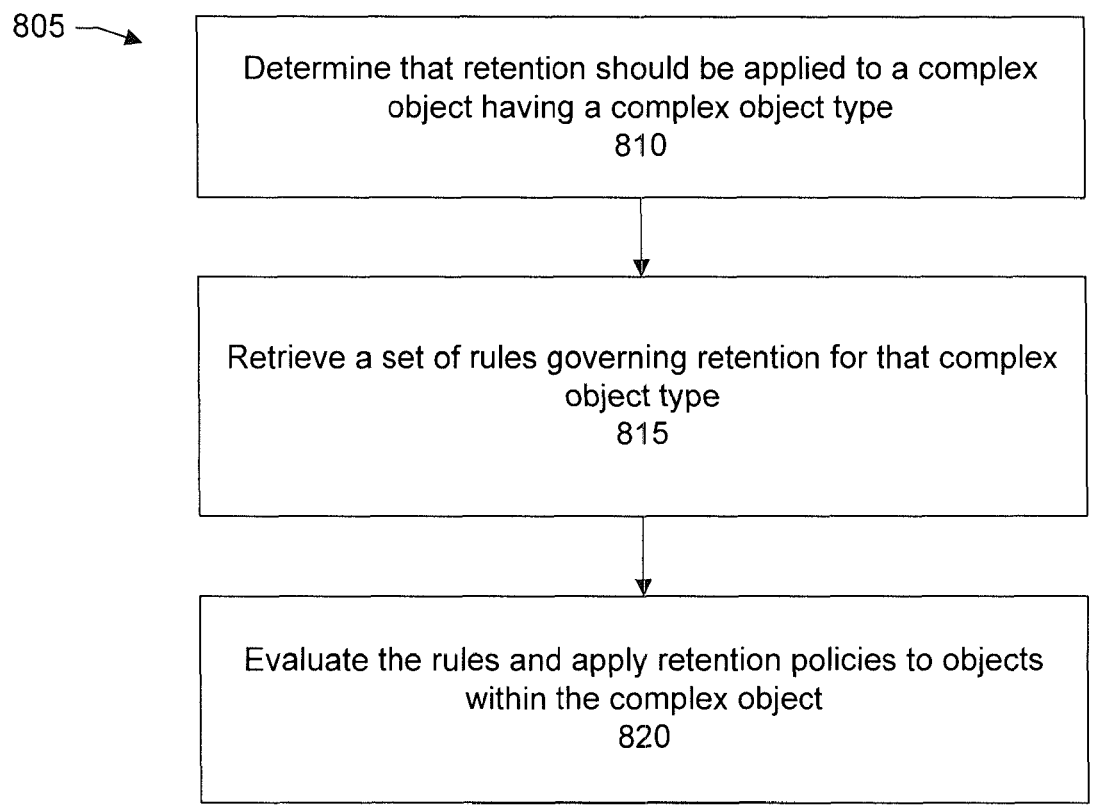
FIG. 8 shows an overall flow for applying retention to a complex object.

FIG. 8 shows an overall flow 805 for applying retention to complex objects. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In a step 810, a determination is made to apply retention to a complex object having a complex object type. That is, the complex object has a retention policy applied to it. In a specific implementation, this can be either inherited from a folder or applied directly. The determination to apply retention can be from the complex object having been placed in a folder where the retention policy is bound to the folder. The determination can be the result of receiving an indication from a user to apply retention. The determination to apply retention can be made dynamically or automatically such as via a preconfigured filter, rule, other criteria, or upon the occurrence of a predetermined event or other trigger.

In a step 815, the system retrieves a set of rules governing retention for complex objects of the complex object type. That is, the system looks for a set of rules that would govern this type of object. For example, the system may be configured to search for the rules in a predefined directory. In a specific implementation, the set of rules are associated to the policy so that the system would enforce the rules that have been setup. In another specific implementation, system looks for a match for the object type in a set of rules that have been defined. In another specific implementation, as the policy is applied, the rules are applied as well (e.g., user selects the rules as well as the policy).

In a step 820, the system evaluates the rules and applies retention policies to objects within the complex object. That is, once the system has the rules, it will evaluate the rules on how to apply the policy. In a specific implementation, the rules define the structure of the complex object and the system identifies all the objects that are part of this complex object. In this specific implementation, for each of the object that the system identifies, the system evaluates the rules to determine what policy needs to be applied. The evaluation of the rules and application of the policy may be performed by matching an attribute, following a relation link, following a folder association, or combinations of these. If an object is another complex object the system looks for a set of rules that would govern that object. If it found a set of rules, the system repeats step 820 for just that complex object.

Figure 9:
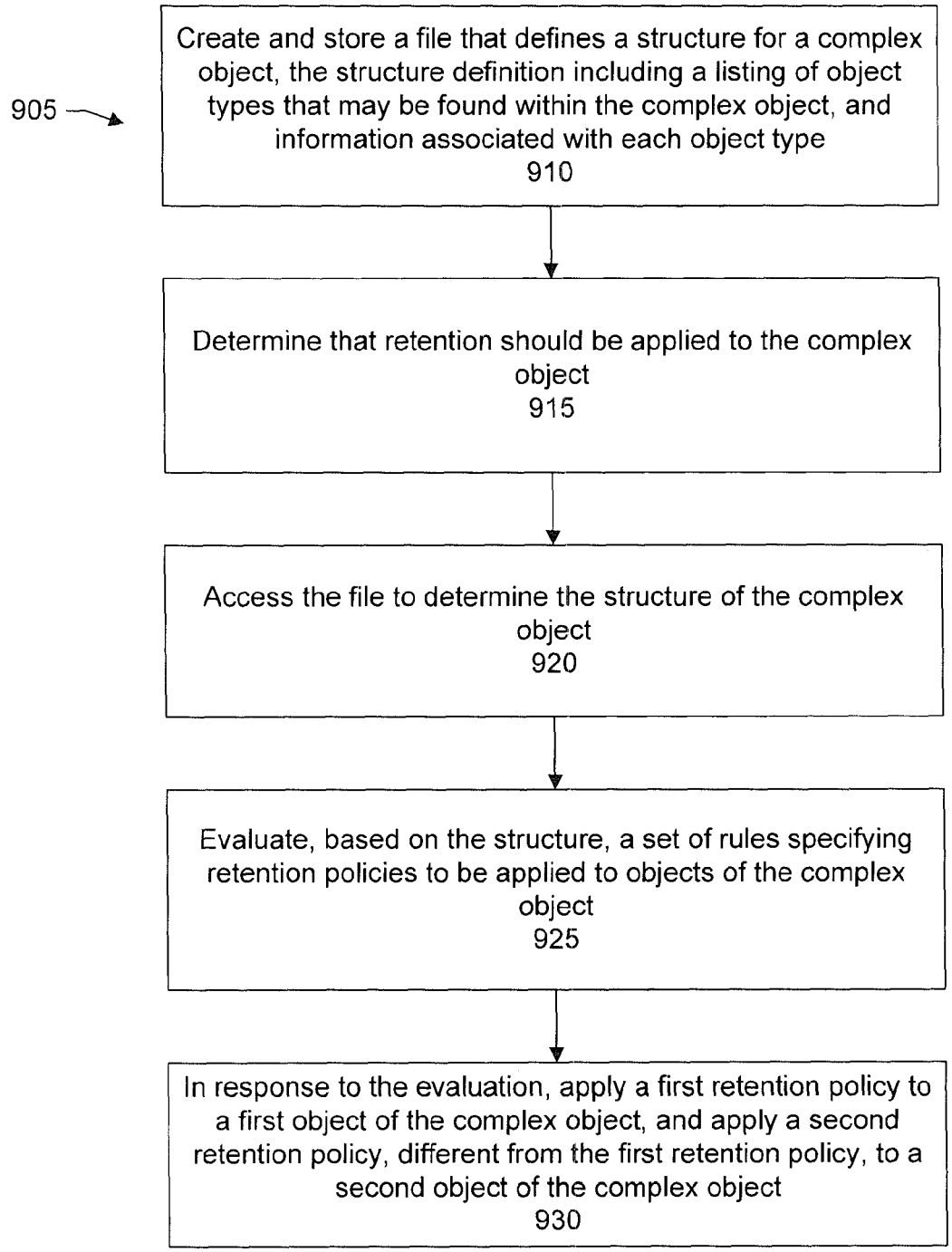
FIG. 9 shows another flow of a specific implementation for applying retention to a complex object.

FIG. 9 shows an overall flow 905 of a specific implementation of a technique for applying retention to a complex object. In brief, in a step 910, a complex object description file is created and stored. The file defines a structure for a type of complex object, the structure definition including a listing of object types or related object types that may be found within the complex object type, and information associated with each object type. In a step 915, the system determines that retention should be applied to the complex object. In a step 920, the system accesses the file to determine the structure of the complex object. In a step 925, the system evaluates, based on the structure, a set of rules specifying retention policies to be applied to objects of the complex object. In a step 930, in response to the evaluation, the system applies a first retention policy to a first object of the complex object, and applies a second retention policy, different from the first retention policy, to a second object of the complex object.

More particularly, the structure definition may include a hierarchy of object types within the complex object type so that a retention policy may be propagated (or not) through the various levels of the hierarchy. The structure definition may be user configurable so that users (e.g., administrators) can create their own relationships between objects. For example, the system may provide a configuration or setup tool at the client such as a wizard GUI where a user can respond to a series of questions provided in the wizard. Based on the responses, the system creates the relationship between the objects. Instead or additionally, the relationships may be defined programmatically such through an application program interface (API) or other. The system may include predefined relationships. The predefined relationships may be included in a template. Depending upon the user configuration, a same or different retention policy may be applied to two objects that are at a same hierarchical level (e.g., peer propagation). A same or different retention policy may be applied to two objects that are at different hierarchical levels (e.g., hierarchical propagation).

In an implementation, the file provides the system with information identifying the policy to apply, how the policy should be applied (e.g., whether the policy comes from inheritance or is a direct application), and the relationships between the objects so that the system can follow the relationships and apply the policy appropriately. In other words, the type of relationship may dictate or guide the type of policy that is applied. Policies may have different aging (e.g., different lifecycle phases through which a retained object is incrementally promoted as it ages), different phase promotion criteria, different disposition options (e.g., delete, transfer to another system or storage location), different deferral options or overrides (e.g., holds to prevent disposition such as where the object in question may be required in a pending investigation, audit, or legal proceeding), or combinations of these.

The file can include a description of the different types of objects so that policy can be applied based on object type. For example, a financial document (e.g., Securities and Exchange Commission (SEC) filing) may have a financial object type. A human resources (HR) document (e.g., employee review) may have an HR object type. Each object type may have a different retention policy. As an example, a retention policy for the HR document may require that the document be retained or preserved for 5 years. A retention policy for the financial document may require that the document be retained for 7 years.

As another example, there can be an email composite object. A retention policy may require the email to be retained for 3 years. The email attachments may be retained for a same or different duration (e.g., a longer duration or a shorter duration). The duration can depend on the type of attachment (e.g., HR versus financial). The file can include information indicating whether an object or object type is an attachment so the appropriate retention policy can be applied to the attachment while a different retention policy is applied to the email message.

The structure definition may describe groups of objects. There can be a policy applied at a group level, and the same or different policy applied at an object level. There can be default policies that are applied in the absence of a specific policy to apply. Policies may be applied based on attribute information. The attributes can include fields and corresponding field values from the object content. The attributes can include object metadata, e.g., metadata fields and corresponding metadata field values.

There can be a single XML file having structure definition information for each type of complex object. That is, each complex object type can have its own section within the single XML file. Alternatively, there can be multiple XML files, each XML file having structure definition information for a particular type of complex object.

Describing a complex object type in order to apply retention policies to objects within a complex object of the type can be through a model. The model can include or be based on an ontology that organizes the objects within a complex object. Some examples of components that may be included in an ontology include classes (e.g., collections of objects within a complex object), categories, classifications, attributes (e.g., properties, features, or parameters associated with an object within a complex object), and relations (e.g., ways in which classes and objects can be related to one another).

In a specific implementation, a method for applying retention to a complex object having a set of objects includes accessing a file including a definition of a structure of the complex object, the definition including a listing of a set of object types that may be found within the complex object, and information associated with each object type, evaluating a set of rules, each rule specifying a retention policy to be applied to an object of the plurality of objects, applying, in response to the evaluation, a first retention policy to a first object of the set of objects, where the first object has a first object type, and the application of the first retention policy is based on first information associated with the first object type, and applying, in response to the evaluation, a second retention policy, different from the first retention policy, to a second object of the set of objects, where the second object has a second object type, and the application of the second retention policy is based on second information associated with the second object type.

In another specific implementation, a method includes building a model including information defining a structure of a first type of complex object, receiving an indication to apply retention to a complex object, determining that the complex object is of the first type, consulting the model to understand the structure, evaluating, based on the structure, a set of rules specifying retention policies, and in response to the evaluation, applying retention policies to objects of the complex object.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method for applying retention to a complex object having a plurality of objects comprising:
   accessing a file comprising a definition of a structure of the complex object, wherein the complex object is a separate file than the file comprising the definition of the structure of the complex object, the definition comprising a listing of a plurality of object types found within the complex object, and information associated with each object type;
   evaluating a set of rules, each rule specifying a retention policy to be applied to an object of the plurality of objects;
   applying, in response to the evaluation, a first retention policy to a first object of the plurality of objects, wherein the first object has a first object type, and the application of the first retention policy is based on first information associated with the first object type; and
   applying, in response to the evaluation, a second retention policy, different from the first retention policy, to a second object of the plurality of objects, wherein the second object has a second object type, and the application of the second retention policy is based on second information associated with the second object type.

2. The method of claim 1 wherein the first retention policy specifies a first length of time for retention, and the second retention policy specifies a second length of time for retention, different from the first length of time.

3. The method of claim 1 wherein the file is formatted as an extensible markup language (XML) file format.

4. The method of claim 1 wherein the information associated with each object type comprises information linking the object type to another object type, and wherein the information linking the object type to the other object type comprises at least one of attribute name, relation name, or folder name.

5. The method of claim 1 wherein the set of rules comprises a rule specifying that the first retention policy is to be applied based on an attribute associated with the first object type.

6. The method of claim 1 wherein the set of rules comprises a rule specifying that the first retention policy is to be applied based on a type of relationship associated with the first object type.

7. The method of claim 1 wherein the set of rules comprises a rule specifying that the first retention policy is to be applied based on a name of a folder associated with the first object type.

8. The method of claim 1 wherein the set of rules comprises a rule specifying that the first retention policy is to be applied based on another object.

9. The method of claim 1 wherein the set of rules comprises a rule specifying that a retention policy to be applied to an object should be the same as a retention policy applied to a root object of the object.

10. A computer program product, comprising a computer-readable program code to be executed by one or more processors when retrieved from a non-transitory computer readable medium, the computer-readable program code including instructions to:
    access a file comprising a definition of a structure of the complex object, wherein the complex object is a separate file than the file comprising the definition of the structure of the complex object, the definition comprising a listing of a plurality of object types found within the complex object, and information associated with each object type;
    evaluate a set of rules, each rule specifying a retention policy to be applied to an object of the plurality of objects;
    apply, in response to the evaluation, a first retention policy to a first object of the plurality of objects, wherein the first object has a first object type, and the application of the first retention policy is based on first information associated with the first object type; and
    apply, in response to the evaluation, a second retention policy, different from the first retention policy, to a second object of the plurality of objects, wherein the second object has a second object type, and the application of the second retention policy is based on second information associated with the second object type.

11. The computer program product of claim 10 wherein the first retention policy specifies a first length of time for retention, and the second retention policy specifies a second length of time for retention, different from the first length of time.

12. The computer program product of claim 10 wherein the file is formatted as an extensible markup language (XML) file format.

13. The computer program product of claim 10 wherein the information associated with each object type comprises information linking the object type to another object type, and wherein the information linking the object type to the other object type comprises at least one of attribute name, relation name, or folder name.

14. The computer program product of claim 10 wherein the set of rules comprises a rule specifying that the first retention policy is to be applied based on an attribute associated with the first object type.

15. The computer program product of claim 10 wherein the set of rules comprises a rule specifying that the first retention policy is to be applied based on a type of relationship associated with the first object type.

16. The computer program product of claim 10 wherein the set of rules comprises a rule specifying that the first retention policy is to be applied based on a name of a folder associated with the first object type.

17. A system for applying retention to a complex object having a plurality of objects, the system comprising:
    one or more processors; and
    a processor based application, which when executed on a computer system, will cause the one or more processors to:
    access a file comprising a definition of a structure of the complex object, wherein the complex object is a separate file than the file comprising the definition of the structure of the complex object, the definition comprising a listing of a plurality of object types found within the complex object, and information associated with each object type;
    evaluate a set of rules, each rule specifying a retention policy to be applied to an object of the plurality of objects;
    apply, in response to the evaluation, a first retention policy to a first object of the plurality of objects, wherein the first object has a first object type, and the application of the first retention policy is based on first information associated with the first object type; and apply, in response to the evaluation, a second retention policy, different from the first retention policy, to a second object of the plurality of objects, wherein the second object has a second object type, and the application of the second retention policy is based on second information associated with the second object type.

18. The system of claim 17 wherein the first retention policy specifies a first length of time for retention, and the second retention policy specifies a second length of time for retention, different from the first length of time.

19. The system of claim 17 wherein the file is formatted as an extensible markup language (XML) file format.

20. The system of claim 17 wherein the information associated with each object type comprises information linking the object type to another object type, and wherein the information linking the object type to the other object type comprises at least one of attribute name, relation name, or folder name.

* * * * *